United States Patent

Englert

(10) Patent No.: US 9,599,370 B2
(45) Date of Patent: Mar. 21, 2017

(54) SOLAR COLLECTOR AND METHOD FOR PRODUCING A LIGHT-ABSORBING SURFACE

(75) Inventor: Peter Englert, Bad Friedrichshall (DE)

(73) Assignee: MAHLE International GmbH, Stuttgart (DE)

( * ) Notice: Subject to any disclaimer, the term of this patent is extended or adjusted under 35 U.S.C. 154(b) by 1347 days.

(21) Appl. No.: 13/360,865

(22) Filed: Jan. 30, 2012

(65) Prior Publication Data

US 2012/0192859 A1    Aug. 2, 2012

Related U.S. Application Data

(63) Continuation of application No. PCT/EP2010/060816, filed on Jul. 26, 2010.

(30) Foreign Application Priority Data

Jul. 29, 2009   (DE) .................. 10 2009 035 238

(51) Int. Cl.
  *F24J 2/48*    (2006.01)
  *B05D 3/00*    (2006.01)

(52) U.S. Cl.
  CPC ............... *F24J 2/485* (2013.01); *Y02E 10/40* (2013.01)

(58) Field of Classification Search
  USPC ............... 126/714, 677, 676; 977/949, 847; 427/123, 126.3, 162, 168, 189, 191, 205
  See application file for complete search history.

(56) References Cited

U.S. PATENT DOCUMENTS

| 5,100,486 | A  | * | 3/1992  | Krikorian ............... C23C 10/18 |
| | | | | 148/248 |
| 6,949,300 | B2 | * | 9/2005  | Gillispie ............... B23K 1/0012 |
| | | | | 148/516 |
| 6,955,834 | B2 | * | 10/2005 | Rohrbaugh et al. ........... 427/180 |
| 7,534,309 | B2 | * | 5/2009  | Toyama ............... B23K 1/0012 |
| | | | | 106/240 |
| 8,158,881 | B2 | * | 4/2012  | Brabec et al. ................. 136/263 |
| 8,581,158 | B2 | * | 11/2013 | Heintz .................. C08F 259/08 |
| | | | | 219/482 |
| 9,056,363 | B2 | * | 6/2015  | Becker .................. B23K 1/0012 |
| 2008/0210219 | A1 | | 9/2008 | Bostrom |
| 2009/0050601 | A1 | * | 2/2009 | Park et al. ....................... 216/13 |
| 2010/0035081 | A1 | * | 2/2010 | Clasen et al. ................. 428/650 |

(Continued)

FOREIGN PATENT DOCUMENTS

| DE | 201 21 992 U1 | 10/2003 |
| DE | 10 2004 031 034 A1 | 2/2005 |

(Continued)

OTHER PUBLICATIONS

Zhang et al., "Soldering Techniques of Thermal Spray," Welding Technology; vol. 37, No. 3, pp. 24-26 (Jun. 28, 2008).

(Continued)

*Primary Examiner* — Steven B McAllister
*Assistant Examiner* — Desmond C Peyton
(74) *Attorney, Agent, or Firm* — Muncy, Geissler, Olds & Lowe, P.C.

(57) ABSTRACT

A solar collector is provided that has a base material and a nanostructured layer integrated into the base material so as to form a light-absorbing surface. The nanostructured layer has nanoparticles of an inorganic material.

15 Claims, 1 Drawing Sheet

(56) References Cited

U.S. PATENT DOCUMENTS

| | | | | |
|---|---|---|---|---|
| 2010/0258111 | A1* | 10/2010 | Shah et al. | 126/635 |
| 2011/0112287 | A1* | 5/2011 | Balaban et al. | 540/122 |
| 2011/0180591 | A1 | 7/2011 | Boger et al. | |
| 2012/0295096 | A1* | 11/2012 | Liu et al. | 428/312.8 |
| 2013/0101836 | A1* | 4/2013 | Aktas et al. | 428/336 |
| 2013/0126796 | A1* | 5/2013 | Chung | H01B 1/08 252/512 |
| 2014/0004371 | A1* | 1/2014 | Chung | H01B 1/02 428/549 |
| 2014/0130794 | A1* | 5/2014 | Antonaia et al. | 126/676 |
| 2014/0248207 | A1* | 9/2014 | Oh et al. | 423/448 |

FOREIGN PATENT DOCUMENTS

| | | | |
|---|---|---|---|
| DE | 20 2005 006 478 U1 | 8/2005 | |
| DE | 10 2006 039 804 A1 | 2/2008 | |
| DE | 2236241 A1 * | 10/2010 | ......... B23K 35/3605 |
| EP | 2 230 112 A1 | 9/2010 | |
| WO | WO 2007/121252 A2 | 10/2007 | |
| WO | WO 2008/055496 A1 | 5/2008 | |
| WO | WO 2008/129133 A | 10/2008 | |

OTHER PUBLICATIONS

Chinese Office Action for Chinese Patent Application No. 201080033033.6 dated Jan. 4, 2013 with English translation.

* cited by examiner

SOLAR COLLECTOR AND METHOD FOR PRODUCING A LIGHT-ABSORBING SURFACE

This nonprovisional application is a continuation of International Application No. PCT/EP2010/060816, which was filed on Jul. 26, 2010, and which claims priority to German Patent Application No. DE 10 2009 035 238.4, which was filed in Germany on Jul. 29, 2009, and which are both herein incorporated by reference.

BACKGROUND OF THE INVENTION

Field of the Invention

The present invention relates to a solar collector, a method for producing a light-absorbing surface, and a use of a surface for light absorption or emission of heat.

Description of the Background Art

Thermal solar installations, such as for hot water production, nowadays are equipped with absorbers whose surfaces are colored black with paints or galvanic coating. Today, such coatings serving as absorbers must be applied post-production to a solar collector with a variety of methods such as painting or galvanic coating. A coolant for removal of the heat is made to flow around these absorbers.

Consequently additional, post-production, polluting application methods (such as chromating) using chemicals or polymers are necessary on heat transmission surfaces. Coatings with polymers are unstable over time in sunlight, so that efficiency losses occur. In addition, the heat energy must overcome the interfaces between the coating and metallic heat exchanger surfaces.

DE 103 61 910 B3 is concerned with a method for paint-free blackening of the surfaces of components including aluminum materials with high silicon content, in which the surface is first prepared using various methods. After a rinsing process, the blackening is obtained by a treatment in an aqueous active solution containing zinc sulfate, ethylenediamine, and ammonium molybdate.

DE 10 2004 031 034 A1, which corresponds to U.S. Pat. No. 8,002,905, and which is incorporated herein by reference, describes a flux for soldering or brazing components. Here, one or more specific surface properties are to be produced as early as the soldering process. Corrosion-resistant, hydrophilic, or adhesive surfaces, as well as a decorative appearance, are made possible in this way.

SUMMARY OF THE INVENTION

It is therefore an object of the present invention to provide an improved solar collector, an improved method for producing a light-absorbing surface, and a use of a surface for light absorption or for emission of heat.

In an embodiment, the invention is based on the finding that black surfaces can be produced during a soldering process by means of a Controlled Atmosphere Brazing (CAB) process for hard soldering aluminum, such as aluminum heat exchangers in particular, or metal, or glass.

The addition of titanium dioxide nanoparticles to flux (Nocolok) results in a dark pigmentation after soldering on surfaces such as aluminum surfaces or metal surfaces or glass surfaces. This dark coloring is used under the name Blackbraze for visual blackening of cooling systems in order to eliminate the need to apply black paint.

Efficient heat exchangers, such as aluminum heat exchangers or heat exchangers made of other metals, for example, can be provided with a strongly light-absorbing surface and used in solar energy technology. This permits an advantageous way of producing a solar collector.

According to an embodiment of the invention, the surface of a thin-walled, highly efficient heat exchanger, such as an aluminum heat exchanger, can be provided with a strongly absorbing black titanium compound. The entire structure here must be inorganic/metallic in order to guarantee appropriate long-term UV stability. The absorption layer must be integrated in the surface of the metallic heat exchanger.

The present invention provides a solar collector with a light-absorbing surface having the following features: a base material with a surface; a nanostructured layer, which is integrated in a total area of the surface in order to form the light-absorbing surface, wherein the nanostructured layer has nanoparticles of an inorganic material. By means of the light-absorbing surface, it is possible for, e.g., solar energy, which is to say light and infrared radiation, to be absorbed. The solar collector can have a coolant channel, through which the coolant can flow. The absorption of the solar energy can lead to heating of the base material and of the coolant.

Nanoparticles have an enormous surface area in relationship to their volume. This means that far more atoms are located on their surface than is the case in larger bodies. Consequently, they are far better able to enter into chemical and physical interactions with their environment.

When titanium dioxide nanoparticles are added in Nocolok flux according to the CAB process, (aluminum) surfaces can be colored an intense black. A surface analysis (ESCA) shows that the black surface formed in the soldering process is in fact titanium oxonitride, which according to the literature is strongly light absorbing.

This layer which forms the black surface is nanostructured and is embedded actually in the surface of the aluminum base material or in the material of the surface made of metal or glass. The matte surfaces exhibit strong absorption of light and also of infrared radiation. As a result, such surfaces are also ideal blackbody radiators and hence can be used for heat emission, particularly in outer space. Because of the reduced interface between the heat exchanger and absorption layer, the energy transfer is highly efficient.

According to an embodiment of the invention, the inorganic material of the nanoparticles can have a greater degree of heat absorption than the base material. For example, the inorganic material can comprise titanium and/or at least one titanium compound. The base material can comprise aluminum, metal, or glass.

The present invention also creates a method for producing a light-absorbing surface that comprises the following steps: provision of a base material having a surface; coating the surface with a layer of nanoparticles of an inorganic material; and heating the surface so that the layer of nanoparticles forms a nanostructured layer that is integrated in the surface in order to form the light-absorbing surface. The method according to the invention can be used to advantage to produce the light-absorbing surface of the solar collector according to the invention.

For example, the layer of nanoparticles can be sprayed onto the surface. To this end, the nanoparticles can be present in a solution. Alternatively, the solution can be applied to the surface in another suitable manner.

Heating of the surface can be accomplished by a heating or soldering process. This process can be brazing. In particular, a CAB soldering process is suitable.

According to an embodiment of the invention, the base material can include aluminum, glass, or metal, and the inorganic material can comprise titanium and/or at least one titanium compound. For example, the layer of nanoparticles can comprise titanium dioxide nanoparticles. Furthermore, the layer of nanoparticles can additionally include a flux, a binder, and a thixotropic agent. In particular, the layer of nanoparticles can comprise a controlled atmosphere brazing flux, a nano titanium dioxide suspension, a polyurethane binder suspension, a polyurethane thickener suspension, and fully deionized water. For example, the layer of nanoparticles can be composed of 25-40% CAB flux, 10-20% nano titanium dioxide suspension, 5-20% polyurethane binder suspension, 1-10% polyurethane thickener suspension, and 30-45% fully deionized water. The percent specifications can be percentage by volume.

The present invention also creates a use of a surface in which a nanostructured layer of nanoparticles of an inorganic material is integrated for the purpose of light absorption or heat emission. The surface can be produced using the method according to the invention.

Overall, when aluminum material is mentioned in this application, a different metal or glass may also be used without any further explicit mention being required. Instead of the soldering process, a corresponding heating method may also be used without parts having to be joined together by soldering. Accordingly, a soldering furnace does not necessarily have to be used, but instead a high-temperature furnace may also be used, if applicable with a protective gas atmosphere, without any further explicit mention being required.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
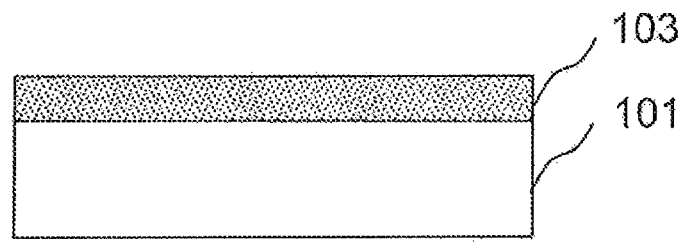
FIG. 1 is a schematic representation of a solar collector according to an embodiment of the invention.

In the following description of preferred exemplary embodiments of the present invention, like or similar reference characters are used for the elements that are shown in the different drawings and have similar effects, with a repeated description of these elements being omitted.

FIG. 1 shows a schematic representation of a solar collector having a base material 101 and a light-absorbing surface 103, according to an exemplary embodiment of the present invention. The light-absorbing surface 103 is integrated in the base material. The light-absorbing surface is nanostructured. Consequently, nanoparticles of an inorganic material, for example a metal, can be embedded in the surface of the material 101 over the entire area.

The solar collector can be implemented as a thin-walled heat exchanger in which aluminum is used as the base material 101.

Titanium compounds are suitable as nanoparticles. Thus, black titanium compounds have the highest degree of absorption as absorbers in comparison to other materials. Thus, $Ti_2O_2N$ has the values $A_\lambda=0.95$, $T_\lambda=0$, $R_\lambda=0.05$ in the visible range, and has the values $A_\lambda=0.05$, $T_\lambda=0$, $R_\lambda=0.95$ in the infrared range. In comparison, black nickel has the values $A_\lambda=0.88$, $T_\lambda=0$, $R_\lambda=0.12$ in the visible range and the values $A_\lambda=0.07$, $T_\lambda=0$, $R_\lambda=0.93$ in the infrared range, black chrome has the values $A_\lambda=0.87$, $T_\lambda=0$, $R_\lambda=0.13$ in the visible range and the values $A_\lambda=0.09$, $T_\lambda=0$, $R_\lambda=0.91$ in the infrared range, and aluminum grating has the values $A_\lambda=0.70$, $T_\lambda=0$, $R_\lambda=0.30$ in the visible range and the values $A_\lambda=0.07$, $T_\lambda=0$, $R_\lambda=0.93$ in the infrared range.

Figure 2:
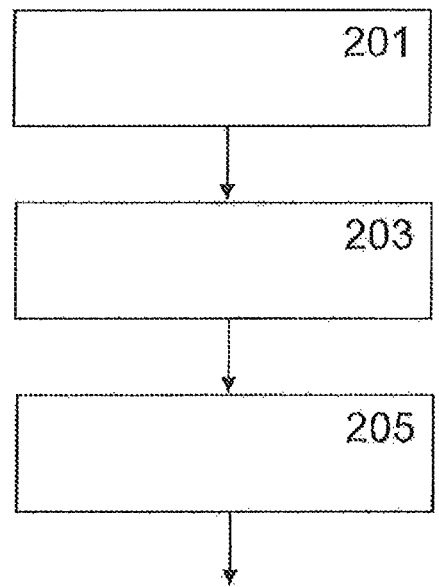
FIG. 2 is a flow chart of a method according to an embodiment of the invention.

FIG. 2 shows a flowchart of a method for producing a light-absorbing surface according to an exemplary embodiment of the present invention. The first step 201 provides a base material having a surface. This can be an aluminum heat exchanger. The surface can be the surface that later on is intended as an absorption surface, for example for solar radiation. Next, in a step 203, a coating of the surface with a layer of nanoparticles of an inorganic material takes place. To this end, a solution that includes the nanoparticles can be applied to the surface, for example. In order to integrate the nanoparticles into the surface, a heating of the surface takes place in a step 205. In this way, the layer of nanoparticles can interact with the surface and form a nanostructured, light-absorbing surface. The heating can take place in a brazing process.

In this way, a strongly light-absorbing coating based on titanium and/or titanium compounds need not be applied to the surface post-production, for example, but instead can be generated "in situ" in the uppermost layers of the aluminum base material during the production (soldering) of the aluminum heat exchanger. The light absorption thereby takes place directly in the uppermost aluminum layers themselves, and is thus transferred faster and more efficiently to a coolant.

According to an exemplary embodiment, in order to produce a light-absorbing aluminum surface, the aluminum heat exchanger for solar engineering can be sprayed, prior to the soldering process, with a suspension of (Nocolok) CAB flux to which a certain percentage of titanium dioxide nanoparticles has been added. In addition, this suspension contains a binder and a thixotropic agent in order to fix the solids of the suspension to the surface until the reaction temperature is reached in the CAB soldering furnace.

When the reaction temperature is reached, a chemical reaction occurs with the aluminum surface, the nitrogen atmosphere, and the nano titanium dioxide particles, with black titanium compounds then being produced that are then incorporated into the melting aluminum surface with the (Nocolok) flux.

In this way, a very intensely black and matte inorganic surface can be produced that strongly absorbs light.

Preferably, 11-20% titanium nanoparticles relative to the solids are added to the (Nocolok) CAB flux.

A preferred formula for aluminum surfaces with solder plating comprises 32.0% CAB flux, 15.0% nano titanium dioxide suspension, 12.0% polyurethane binder suspension, 5.0% polyurethane thickener suspension, and 36.0% fully deionized water.

Heating of the surface can take place during brazing of individual parts for heat exchangers, so no additional step for heating is necessary. Aluminum or aluminum alloys can be used as the base material for the heat exchangers. A suitable soldering process is so-called "Nocolok" soldering, which uses a flux based on potassium fluoroaluminates with the empirical formula $K_{1-3}AlF_{4-8}$ that is commercially available under the name "Nocolok." This "Nocolok" flux remains on the surface after soldering, and can coat it with a crystalline layer.

The light-absorbing surface can include elementary Ti and Ti in a bonding state, for example TiO and/or nitride, as a component. In addition, the surface can include moieties in tetravalent form and compounds such as $K_2TiF_6$. It is possible here that Ti is not detectable in the surface region, but instead is only detectable after 60 min argon ion etching, corresponding to a removal of approximately 280 nm $SiO_2$ equivalent layer thickness.

The exemplary embodiments described are chosen merely by way of example and may be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A solar collector having a light-absorbing surface comprising:
   a base material having a surface; and
   a nanostructured layer that is integrated in a total area of the surface of the base material thereby forming the light-absorbing surface,
   wherein the nanostructured layer has nanoparticles of an inorganic material, and
   wherein the nanostructured layer additionally includes a flux, a binder and a thixotropic agent.

2. The solar collector according to claim 1, wherein the inorganic material of the nanoparticles has a greater degree of heat absorption than the base material.

3. The solar collector according to claim 1, wherein inorganic material comprises titanium and/or at least one titanium compound.

4. The solar collector according to claim 1, wherein the base material comprises aluminum, metal, or glass.

5. A method for producing a light-absorbing surface, the method comprising:
   providing a base material having a surface;
   coating the surface with a layer of nanoparticles of an inorganic material; and
   heating the surface so that the layer of nanoparticles forms a nanostructured layer that is integrated in the surface in order to form the light-absorbing surface,
   wherein the layer of nanoparticles additionally includes a flux, a binder, and a thixotropic agent.

6. The method according to claim 5; wherein the layer of nanoparticles is sprayed onto the surface.

7. The method according to claim 5, wherein the heating of the surface is done via a soldering process.

8. The method according to claim 5, wherein the base material includes aluminum, and the inorganic material comprises titanium and/or at least one titanium compound.

9. The method according to claim 5, wherein the layer of nanoparticles comprises titanium dioxide nanoparticles.

10. The method according to claim 5, wherein the layer of nanoparticles comprises a controlled atmosphere brazing flux, a nano titanium dioxide suspension, a polyurethane binder suspension, a polyurethane thickener suspension, and fully deionized water.

11. The method according to claim 10, wherein the layer of nanoparticles is composed of 25-40% CAB flux, 10-20% nano titanium dioxide suspension, 5-20% polyurethane binder suspension, 1-10% polyurethane thickener suspension, and 30-45% fully deionized water.

12. The solar collector according to claim 1, wherein the layer of nanoparticles comprises a controlled atmosphere brazing flux, a nano titanium dioxide suspension, a polyurethane binder suspension, a polyurethane thickener suspension, and fully deionized water.

13. The solar collector according to claim 12, wherein the layer of nanoparticles is composed of 25-40% CAB flux, 10-20% nano titanium dioxide suspension, 5-20% polyurethane binder suspension, 1-10% polyurethane thickener suspension, and 30-45% fully deionized water.

14. The solar collector according to claim 13, wherein the layer of nanoparticles is composed of 32% CAB flux, 15% nano titanium dioxide suspension, 12% polyurethane binder suspension, 5% polyurethane thickener suspension, and 36% fully deionized water.

15. The method according to claim 11, wherein the layer of nanoparticles is composed of 32% CAB flux, 15% nano titanium dioxide suspension, 12% polyurethane binder suspension, 5% polyurethane thickener suspension, and 36% fully deionized water.

* * * * *